US012583054B2

(12) United States Patent
Lin et al.

(10) Patent No.: US 12,583,054 B2
(45) Date of Patent: Mar. 24, 2026

(54) ADAPTIVE TOOL HOLDER FOR ROBOTIC ARM

(71) Applicant: National Chung Cheng University, Chiayi (TW)

(72) Inventors: Pai-Chen Lin, Chiayi (TW); Zhen-Wei Zhuang, Chiayi (TW)

(73) Assignee: NATIONAL CHUNG CHENG UNIVERSITY, Chiayi (TW)

( * ) Notice: Subject to any disclaimer, the term of this patent is extended or adjusted under 35 U.S.C. 154(b) by 328 days.

(21) Appl. No.: 18/189,845

(22) Filed: Mar. 24, 2023

(65) Prior Publication Data

US 2024/0316688 A1 Sep. 26, 2024

(51) Int. Cl.
*B23K 20/12* (2006.01)
*B25J 11/00* (2006.01)

(52) U.S. Cl.
CPC ......... *B23K 20/1255* (2013.01); *B25J 11/005* (2013.01)

(58) Field of Classification Search
CPC .... B23K 20/12–1295; B23Q 2230/002; B23B 31/083
See application file for complete search history.

(56) References Cited

U.S. PATENT DOCUMENTS

| | | | | | |
|---|---|---|---|---|---|
| 2,744,329 | A | * | 5/1956 | Way | B25H 7/045 |
| | | | | | 408/91 |
| 3,126,793 | A | * | 3/1964 | Jennings et al. | B23C 3/34 |
| | | | | | 409/184 |
| 3,761,104 | A | * | 9/1973 | Kubicek | B23B 51/101 |
| | | | | | 279/83 |
| 5,718,366 | A | * | 2/1998 | Colligan | B23K 20/125 |
| | | | | | 228/2.1 |
| 7,367,087 | B2 | * | 5/2008 | Colombo | B23B 31/083 |
| | | | | | 408/239 R |
| 8,757,468 | B1 | * | 6/2014 | Burton | B23K 20/124 |
| | | | | | 228/2.1 |
| 10,799,980 | B2 | * | 10/2020 | Packer | B23K 20/1255 |
| 10,926,340 | B2 | * | 2/2021 | Shimada | B23B 31/083 |

(Continued)

FOREIGN PATENT DOCUMENTS

| | | | | |
|---|---|---|---|---|
| DE | 102011122040 A1 | * | 6/2013 | B23B 31/083 |
| GB | 246407 A | * | 1/1926 | |

(Continued)

*Primary Examiner* — Keith Walker
*Assistant Examiner* — Carlos J Gamino
(74) *Attorney, Agent, or Firm* — MUNCY, GEISSLER, OLDS & LOWE, P.C.

(57) ABSTRACT

An adaptive tool holder of a robotic arm includes: a tool shank; a hollow barrel seat, connected below the tool shank; a ball spline with an upper section, an outer convex ring and a lower section; a spring seat, disposed within the barrel seat and located on the upper section of the ball spline; an elastic element, disposed within the barrel seat, where both ends of the elastic element abut against a bottom of the tool shank and the spring seat respectively; a spring guide pin, disposed through the spring seat; a connecting post, disposed within the lower section of the ball spline, where a top of the connecting post is connected and fixed to the spring guide pin; and a friction stir welding tool inserted and fixed detachably at a bottom end of the connecting post.

10 Claims, 8 Drawing Sheets

(56) References Cited

U.S. PATENT DOCUMENTS

| | | | | |
|---|---|---|---|---|
| 12,083,618 | B2 * | 9/2024 | Fleck | ................. B23K 20/1245 |
| 2006/0124691 | A1 * | 6/2006 | Wood | ................. B23K 20/1265 |
| | | | | 228/2.1 |
| 2008/0006677 | A1 * | 1/2008 | Kumagai | ............. B23K 20/125 |
| | | | | 228/101 |
| 2008/0112768 | A1 * | 5/2008 | Matlack | ................... B23Q 3/16 |
| | | | | 408/1 BD |
| 2009/0308913 | A1 * | 12/2009 | Hall | ................... B23K 20/1265 |
| | | | | 228/112.1 |
| 2010/0072261 | A1 * | 3/2010 | Cruz | .................... B23K 20/123 |
| | | | | 228/2.1 |
| 2015/0143686 | A1 * | 5/2015 | Blacket | ................. F16D 57/002 |
| | | | | 29/243.526 |
| 2017/0072476 | A1 * | 3/2017 | Baird | ................... B23B 31/083 |
| 2022/0331897 | A1 | 10/2022 | Pierron et al. | |
| 2024/0399467 | A1 * | 12/2024 | Yanagihara | ............... B23C 3/12 |

FOREIGN PATENT DOCUMENTS

| | | | | |
|---|---|---|---|---|
| JP | | 60118445 | A * | 6/1985 |
| JP | | 2712838 | B2 | 2/1998 |

* cited by examiner

100'

W

ADAPTIVE TOOL HOLDER FOR ROBOTIC ARM

BACKGROUND

Technical Field

The present invention relates to a tool holder for friction stir welding, and in particular to an adaptive tool holder for a robotic arm.

Related Art

The method for welding two metals (usually aluminum) together by friction stir welding has been well-known, such as the friction stirring welding (FSW) technology published by the Welding Research Institute (TWI) of UK in 1991, and later a technology disclosed in the Japanese Patent No. 2712838 entitled "Friction Welding Method". Both technologies include inserting a tool head of a high-speed rotating cutting tool between two clamped metals, reducing a yield strength of parts where the two metals are in contact with the tool head and keeping a solid state with a low strength using heat generated by friction between the tool head and the two metals when the tool head rotates at a high speed, stirring to mix the parts where the yield strength of the two metals is reduced using the tool head, and welding the two metals together as the yield strength of the two metals gradually recovers after cooling. In short, the friction stirring welding technology is to convert mechanical kinetic energy of the cutting tool into heat energy through rotation and friction of two workpieces by a tool inserted between the workpieces, causing a plastic deformation of the parts where the friction occurs of the two workpieces due to the heat, and enabling the two workpieces to be joined by material stirring.

Referring to FIG. 1, a conventional tool holder for friction stir welding 100' with a larger volume is too large and bulky (about 19 kg in weight) for a workpiece requiring more precision machining to achieve desired machining precision. Furthermore, referring to FIG. 2, a serrated finished product will be produced if a workpiece W is bent or uneven, resulting in incomplete machining and an increased defect rate.

In addition, US Patent Publication No. US20220331897A1 disclosed Friction Stir Welding Head And Method Using The Same, where one or more elastic elements for transmitting an axial force is interposed between an upper surface of a housing (namely, against an inner plate) and an upper surface of a frame. However, the elastic element does not directly act on a used cutting tool, and an overall volume of the tool head is too large to achieve desired machining precision for a workpiece that must be machined with high precision.

SUMMARY

Based on above reasons, an objective of the present invention is to provide an adaptive tool holder for a robotic arm for friction stir welding. An elastic element such as a retractable spring is disposed within a barrel seat and between a spring seat and a tool shank, so that a connecting post directly fixed to a friction stir welding tool moves adaptively along with a spring seat through a spring guide pin, and compared with conventional structures, the adaptive tool holder is simple and light, thus a volume reduction effect can be achieved and curved and/or uneven surfaces can be adjusted adaptively, thereby improving a yield.

Another objective of the present invention is to provide an adaptive tool holder for a robotic arm. A movable stroke of an elastic element is adjusted based on a distance between an inner convex ring of a barrel seat and a peripheral wall of a spring seat, so as to make an adaptive stroke setting according to surface conditions of a workpiece to be machined.

In order to achieve the above objectives, the present invention provides an adaptive tool holder for a robotic arm, including: a tool shank; a hollow barrel seat connected below the tool shank; a ball spline with an upper section, an outer convex ring and a lower section, where the outer convex ring is detachably fixed at a bottom of the barrel seat, so that the upper section is inside the barrel seat and the lower section is outside the barrel seat; a spring seat, disposed within the barrel seat and located on the upper section of the ball spline; an elastic element, disposed within the barrel seat, where both ends of the elastic element abut against a bottom of the tool shank and the spring seat respectively; a spring guide pin, disposed through the spring seat; a connecting post, disposed within the lower section of the ball spline, where a top of the connecting post is connected and fixed to the spring guide pin; and a friction stir welding tool, inserted and fixed detachably at a bottom end of the connecting post.

In some embodiments, the adaptive tool holder further includes a spring washer disposed between the elastic element and the spring seat.

In some embodiments, the elastic element is a retractable spring.

In some embodiments, an inner convex ring projects from an inner side of a top of the barrel seat.

In some embodiments, the spring seat has a base plate and a peripheral wall, where the peripheral wall extends upward from a periphery of the base plate.

In some embodiments, a distance defined as a movable stroke of the elastic element exists between the inner convex ring of the barrel seat and the peripheral wall of the spring seat.

In some embodiments, a plurality of first bolts passes upward through the outer convex ring of the ball spline from below the outer convex ring to a bottom of the barrel seat to form a detachable fixation.

In some embodiments, a set screw transversely passes through the connecting post and abuts against the friction stir welding tool to form a detachable fixation.

In some embodiments, an oil injection hole transversely penetrates the barrel seat adjacent to the upper section of the ball spline.

In some embodiments, an outer surface of the tool shank has a fixing groove, so that the tool shank is detachably fixed to a robotic arm by a fixing bolt.

The technical features and advantages of the present invention have been quite extensively summarized above, so that the detailed description of the present invention below can be better understood. Other technical features and advantages that constitute the subject matter of the claims of the present invention will be described below. A person of ordinary skill in the art of the present invention should understand that the concepts and specific embodiments disclosed below can be used fairly easily to modify or design other structures or processes to achieve the same objectives as those of the present invention. A person of ordinary skill in the art of the present invention should also understand that such equivalent constructions do not depart from the spirit and scope of the present invention as defined by the appended claims.

DETAILED DESCRIPTION

Specific implementations of the present invention are described in detail below in combination with specific cases.

Figure 1:
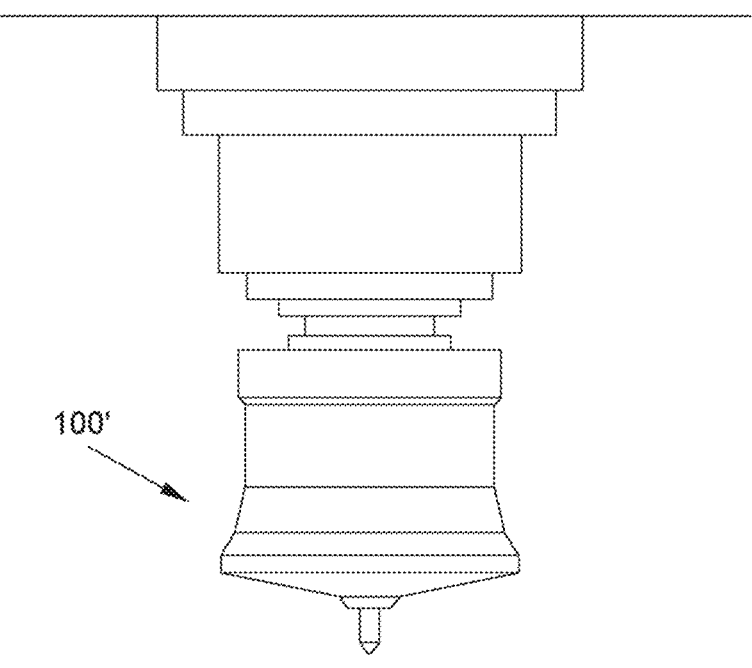
FIG. 1 is a perspective schematic diagram of a conventional tool holder for a robotic arm being installed in a machining device.
Figure 2:
FIG. 2 is a schematic diagram of a finished product after a workpiece is machined by a conventional adaptive tool holder for friction stir welding.
Figure 3:
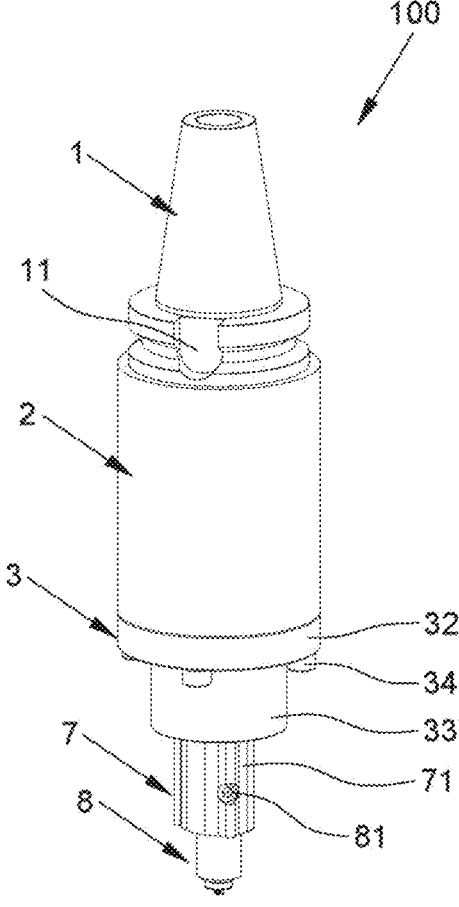
FIG. 3 is a perspective schematic diagram of an adaptive tool holder for a robotic arm according to some embodiments of the present invention.
Figure 4:
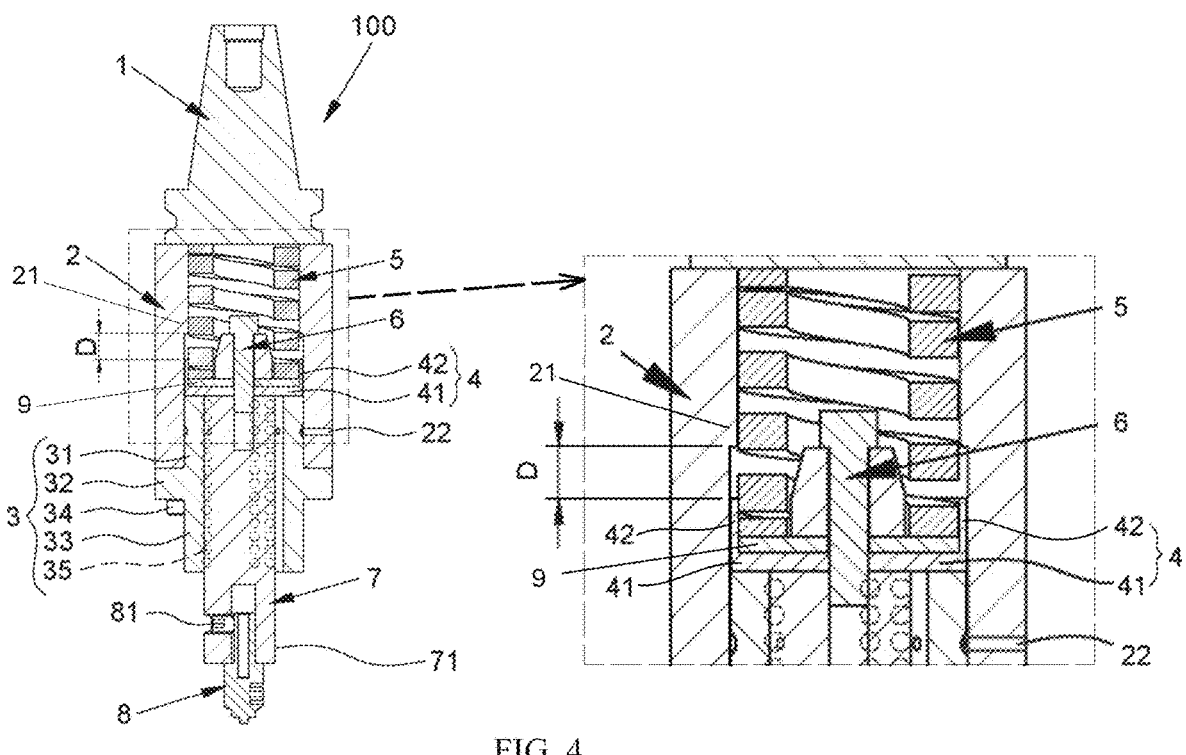
FIG. 4 is a schematic cross-sectional view of an adaptive tool holder for a robotic arm according to some embodiments of the present invention.
Figure 5:
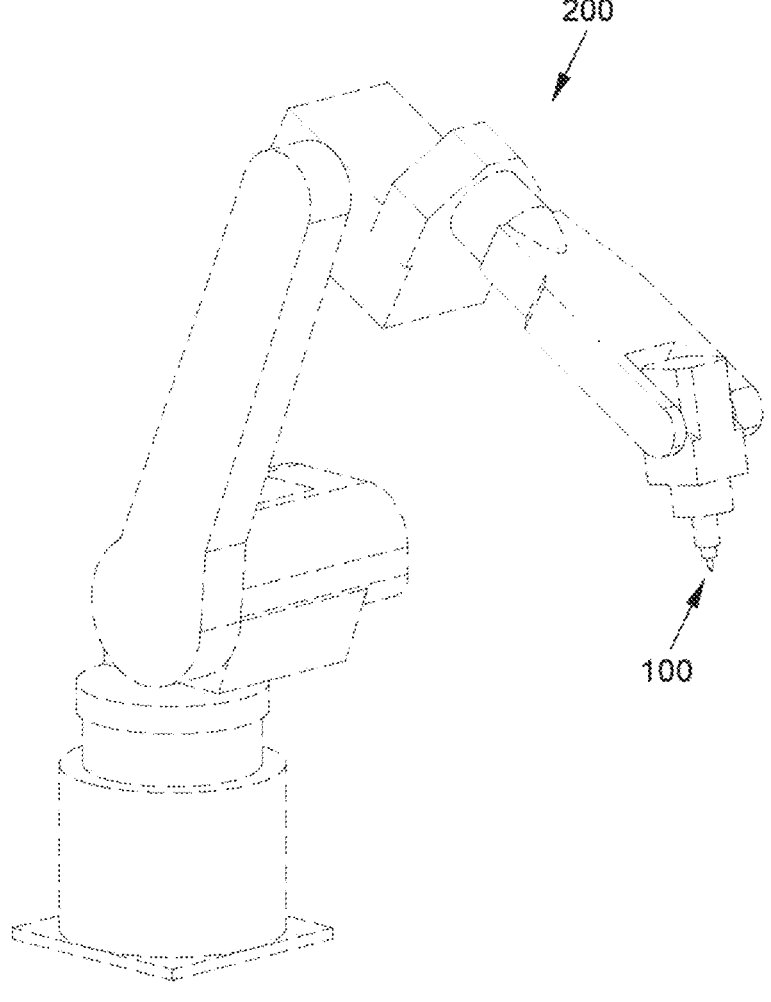
FIG. 5 is a schematic diagram of an adaptive tool holder for a robotic arm being installed in a robotic arm according to some embodiments of the present invention.
Figure 6:
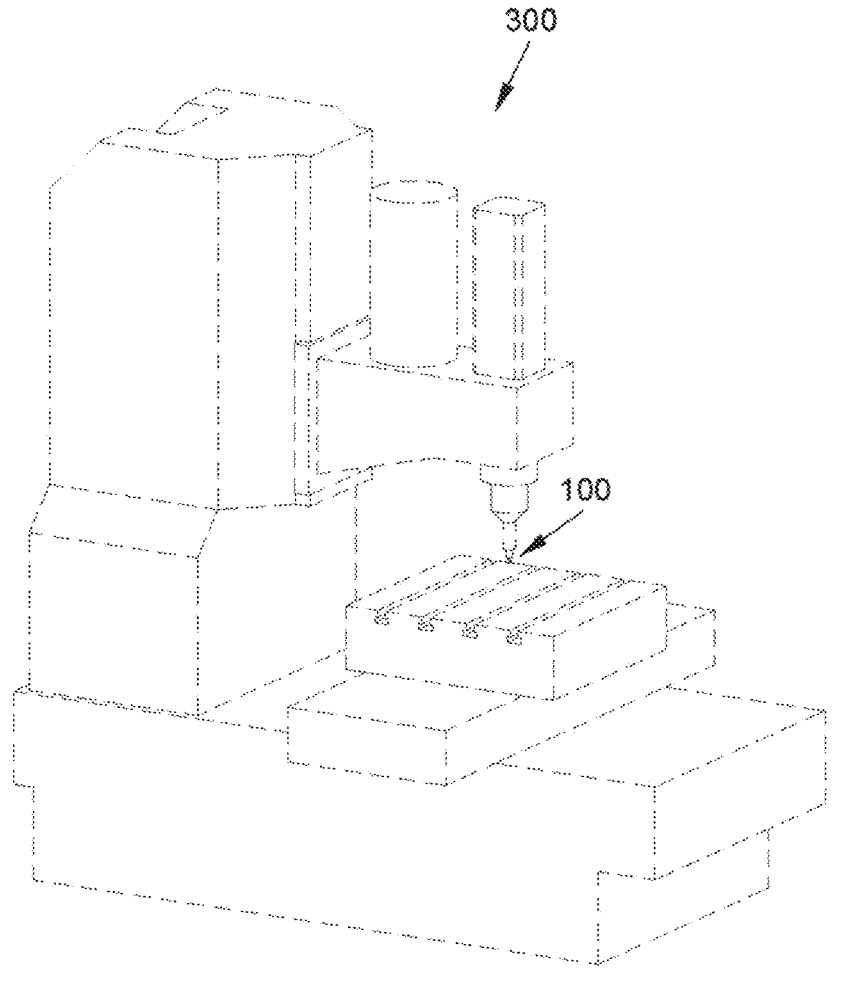
FIG. 6 is a perspective schematic diagram of an adaptive tool holder for a robotic arm being installed in a machining device according to some embodiments of the present invention.

FIG. 3 is a perspective schematic diagram of an adaptive tool holder for a robotic arm according to some embodiments of the present invention. FIG. 4 is a schematic cross-sectional view of an adaptive tool holder for a robotic arm according to some embodiments of the present invention. FIG. 5 is a schematic diagram of an adaptive tool holder for a robotic arm being installed in a robotic arm according to some embodiments of the present invention. FIG. 6 is a perspective schematic diagram of an adaptive tool holder for a robotic arm being installed in a machining device according to some embodiments of the present invention.

Referring to FIG. 5 and FIG. 6, the adaptive tool holder for friction stir welding 100 of a robotic arm according to the present invention can be installed in a robotic arm 200 (as shown in FIG. 5) or in a machining device 300 (as shown in FIG. 6) to machine a workpiece by stir welding. The embodiments of the present invention are illustrated as being installed on the robotic arm 200, but the case available for the machining device 300 is not excluded.

Referring to FIG. 3 and FIG. 4, an adaptive tool holder for friction stir welding 100 of a robotic arm according to the present invention includes a tool shank 1, a barrel seat 2, a ball spline 3, a spring seat 4, an elastic element 5, a spring guide pin 6, a connecting post 7 and a friction stir welding tool 8.

The tool shank 1 is substantially conical, and an outer surface of the tool shank 1 has a fixing groove 11 so that the tool shank is detachably fixed through a fixing bolt (not shown) to a robotic arm 200 (referring to FIG. 5).

The barrel seat 2 is substantially hollow and cylindrical and is connected below the tool shank 1. In some embodiments, an inner convex ring 21 can project from an inner side of a top of the barrel seat 2.

The ball spline 3 has an upper section 31, an outer convex ring 32 and a lower section 33. The outer convex ring 32 is detachably fixed at a bottom of the barrel seat 2, so that the upper section 31 is inside the barrel seat 2 and the lower section 33 is outside the barrel seat 2. In some embodiments, a plurality of first bolts 34 passes upward through the outer convex ring 32 of the ball spline 3 from below the outer convex ring 32 to a bottom of the barrel seat 2 to form a detachable fixation. Generally, a plurality of ball chains 35 is inside the ball spline 3, but it is not limited to this.

The spring seat 4 is disposed within the barrel seat 2 and located on the upper section 31 of the ball spline 3. In some embodiments, the spring seat 4 has a base plate 41 and a peripheral wall 42. The peripheral wall 42 is disposed extending upward from a periphery of the base plate 41. While a distance D exists between the inner convex ring 21 of the barrel seat 2 and the peripheral wall 42 of the spring seat 4.

The elastic element 5 is disposed within the barrel seat 2, and both ends of the elastic element 5 abut against a bottom of the tool shank 1 and the spring seat 4 respectively. In some embodiments, a spring washer 9 can also be disposed between the elastic element 5 and the spring seat 4 to avoid friction between the elastic element 5 and the spring seat 4, and the spring washer 9 can be replaced by a simple operation without replacing the spring seat 4, thus reducing the cost. In a preferred embodiment, the elastic element 5 may be a retractable spring, but it is not limited to this.

In some embodiments, by the distance D between the inner convex ring 21 of the barrel seat 2 and the peripheral wall 42 of the spring seat 4, the distance D can be defined as a movable stroke of the elastic element 5.

The spring guide pin 6 is disposed through the spring seat 4.

The connecting post 7 is disposed within the lower section 33 of the ball spline 3, and a top of the connecting post 7 is connected and fixed to the spring guide pin 6, so that the connecting post 7 moves together with the elastic element 5 through the spring guide pin 6. In some embodiments, a plurality of axial guide grooves 71 disposed corresponding to a plurality of ball chains 35 inside the ball spline 3 is located on an outer surface of the connecting post 7, so that the connecting post 7 can be determined to move back and forth in an axial direction through the plurality of ball chains 35 inside the ball spline 3 without angular deflection.

In some embodiments, an oil injection hole 22 transversely penetrates the barrel seat 2 adjacent to the upper section 31 of the ball spline 3, and a lubricant such as lubricating oil is injected through the oil injection hole 22 to reduce friction between the guide grooves 71 of the connecting post 7 and the ball chains 35 of the ball spline 3 to enable a smoother relative movement.

The friction stir welding tool 8 is inserted and fixed detachably at a bottom end of the connecting post 7. In some embodiments, a set screw 81 transversely passes through the connecting post 7 and abuts against the friction stir welding tool 8 to form a detachable fixation.

Figure 7:
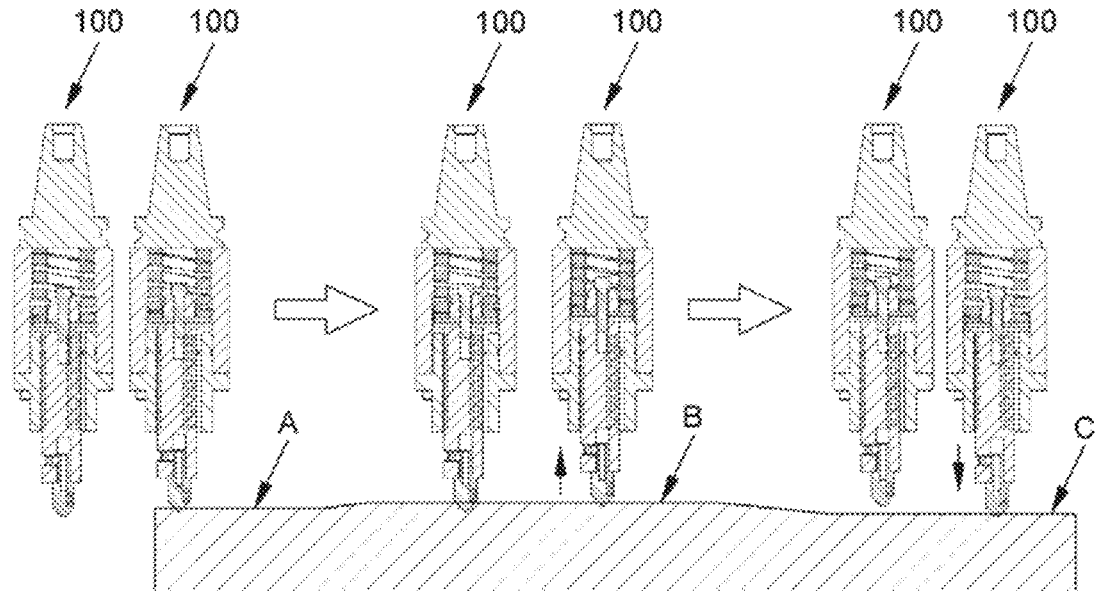
FIG. 7 is a schematic diagram of operations of an adaptive tool holder for a robotic arm according to some embodiments of the present invention.
Figure 8:
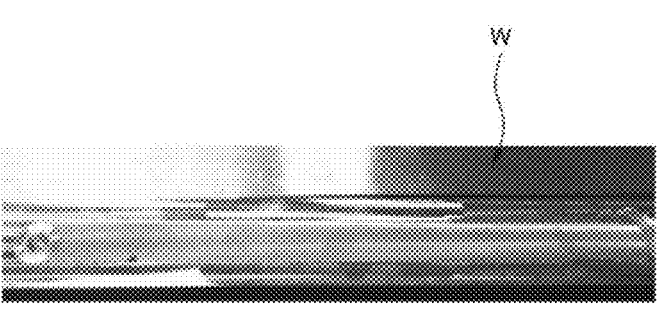
FIG. 8 is a schematic diagram of a finished product after a workpiece is machined by an adaptive tool holder for a robotic arm according to some embodiments of the present invention.

FIG. 7 is a schematic diagram of operations of an adaptive tool holder for a robotic arm according to some embodiments of the present invention. FIG. 8 is a schematic diagram of a finished product after a workpiece is machined by an adaptive tool holder for a robotic arm according to some embodiments of the present invention.

Referring to FIG. 1, FIG. 2, FIG. 7 and FIG. 8 at the same time, because the connecting post 7 can move together with the elastic element 5 through the spring guide pin 6, and then the friction stir welding tool 8 can move together with the elastic element 5 through the connecting post 7, that is, the elastic element 5, the spring guide pin 6, the connecting post 7 and the friction stir welding tool 8 can move back and forth axially on the same axis to achieve an adaptive effect. As shown in FIG. 7, when the friction stir welding tool 8 of the adaptive tool holder for friction stir welding 100 of a robotic arm moves from an originally flat surface A to a higher surface B, the friction stir welding tool 8 can adaptively fit to the higher surface by above moving together to compress the elastic element (or reduce the movable stroke of the elastic element), that is, reduce the distance D between the inner convex ring 21 of the barrel seat 2 and the peripheral wall 42 of the spring seat 4; and when the friction stir welding tool 8 of the adaptive tool holder for friction stir welding 100 of a robotic arm moves from the higher surface B to a lower surface C, the friction stir welding tool 8 can adaptively fit to the lower surface by above moving together to stretch the elastic element (or restore the movable stroke of the elastic element), that is, restore the distance D between the inner convex ring 21 of the barrel seat 2 and the peripheral wall 42 of the spring seat 4. Compared with the conventional machining surface shown in FIG. 2, the adaptive tool holder for friction stir welding 100 of a robotic arm according to the present invention can from a relatively consistent machining surface on the workpiece W, as shown in FIG. 8.

In summary, according to the adaptive tool holder for friction stir welding 100 of a robotic arm according to the present invention, the elastic element 5 such as a retractable spring is disposed within the barrel seat 2 and between spring seat 4 and the tool shank 1, so that the connecting post 7 directly fixed to the friction stir welding tool 8 moves adaptively along with the spring seat 4 through the spring guide pin 6, and compared with the conventional structure, the adaptive tool holder is simple and light (about 16 kg), thus a volume reduction effect can be achieved and curved and/or uneven surfaces can be adjusted adaptively, thereby improving a yield.

Furthermore, the movable stroke of the elastic element 5 is adjusted by the distance D between the inner convex ring 21 of the barrel sea 2 and the peripheral wall 42 of the spring seat 4, so as to make an adaptive stroke setting according to surface conditions of a workpiece to be machined.

What is claimed is:

1. An adaptive tool holder for-friction stir welding of a robotic arm, comprising:

a tool shank;

a hollow barrel seat, connected below the tool shank;

a ball spline with an upper section, an outer convex ring and a lower section, wherein the outer convex ring is detachably fixed at a bottom of the barrel seat, so that the upper section is inside the barrel seat and the lower section is outside the barrel seat;

a spring seat, disposed within the barrel seat and located on the upper section of the ball spline;

an elastic element, disposed within the barrel seat, wherein both ends of the elastic element abut against a bottom of the tool shank and the spring seat respectively;

a spring guide pin, disposed through the spring seat;

a connecting post, disposed within the lower section of the ball spline, wherein a top of the connecting post is connected and fixed to the spring guide pin; and a friction stir welding tool, inserted and fixed detachably at a bottom end of the connecting post.

2. The adaptive tool holder according to claim 1, further comprising a spring washer, disposed between the elastic element and the spring seat.

3. The adaptive tool holder according to claim 2, wherein the elastic element is a retractable spring.

4. The adaptive tool holder according to claim 1, wherein an inner convex ring projects from an inner side of a top of the barrel seat.

5. The adaptive tool holder according to claim 4, wherein the spring seat has a base plate and a peripheral wall, and the peripheral wall extends upward from a periphery of the base plate.

6. The adaptive tool holder according to claim 5, wherein a distance defined as a movable stroke of the elastic element exists between the inner convex ring of the barrel seat and the peripheral wall of the spring seat.

7. The adaptive tool holder according to claim 1, wherein a bolt passes upward through the outer convex ring of the ball spline from below the outer convex ring to a bottom of the barrel seat to form a detachable fixation.

8. The adaptive tool holder according to claim 1, wherein a set screw transversely passes through the connecting post and abuts against the friction stir welding tool to form a detachable fixation.

9. The adaptive tool holder according to claim 1, wherein an oil injection hole transversely penetrates the barrel seat adjacent to the upper section of the ball spline.

10. The adaptive tool holder according to claim 1, wherein an outer surface of the tool shank has a fixing groove, so that the tool shank is detachably fixed to the robotic arm.

\* \* \* \* \*